Oct. 22, 1940.     J. KANTOR     2,219,032
CARBONATOR
Filed Oct. 21, 1938
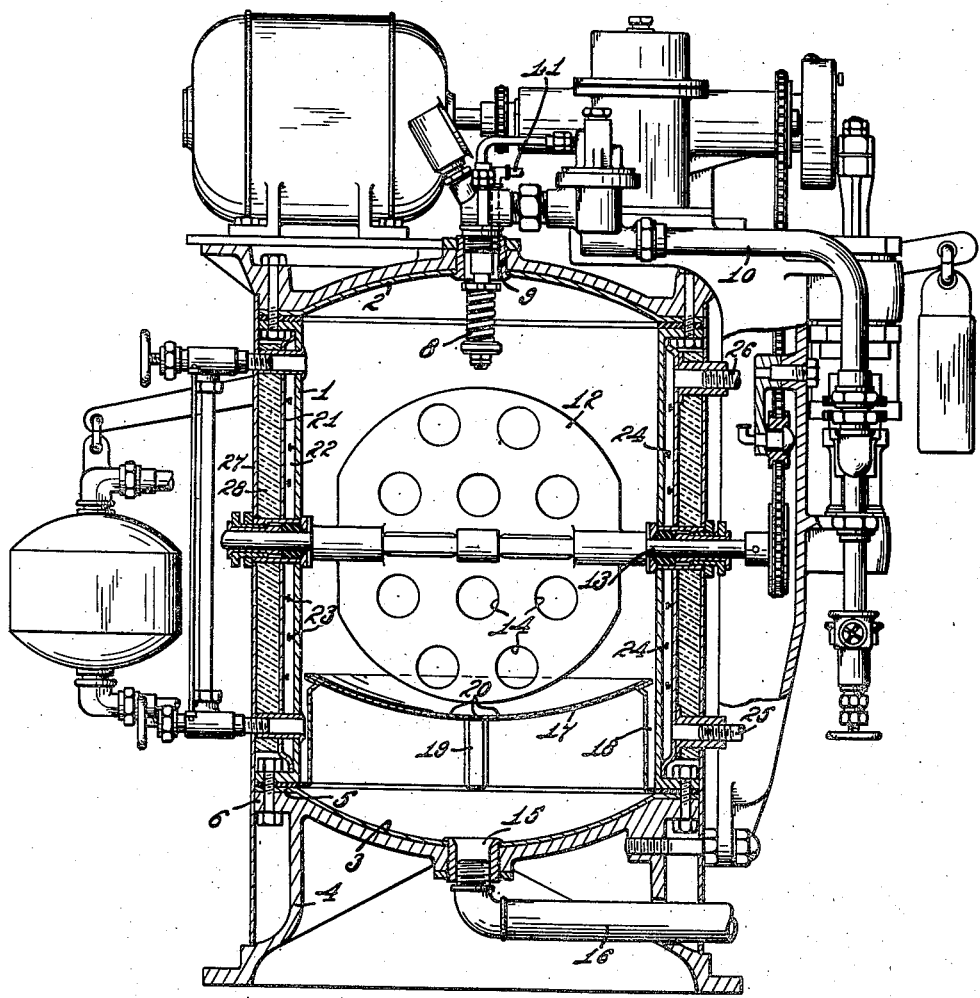
INVENTOR.
James Kantor,
BY
Hood & Hahn.
ATTORNEYS.

Patented Oct. 22, 1940

2,219,032

UNITED STATES PATENT OFFICE 2,219,032

CARBONATOR

James Kantor, Chicago, Ill., assignor to The Liquid Carbonic Corporation, Chicago, Ill., a corporation of Delaware Application October 21, 1938, Serial No. 236,235

6 Claims. (Cl. 261—83)

My invention relates to improvements in carbonators and particularly to that type of carbonator wherein a stream of water is sprayed into a container through an atmosphere of carbon dioxide for the purpose of causing the water to absorb the carbon dioxide.

The particular type of carbonator to which my invention more specifically relates, in addition to spraying the water through an atmosphere of carbon dioxide, the water, after falling to the bottom of the carbonator, is additionally agitated by means of a suitable rotatable agitator.

In this type of carbonator, the water is drawn, as a rule, from the bottom of the tank and as a result, in passing into the containers adapted to be filled, due to this agitation of the water, for the purpose of causing the same to absorb carbon dioxide, the water is still in an agitated state as it passes into the container, resulting in fairly rapid release of the carbon dioxide in the water, thereby causing the material in the container to foam.

My invention relates to the provision of means whereby I am enabled to prevent undue agitation of the water at the point where it is being drawn off from the carbonator but to provide additional means whereby the absorption characteristic of the water may be materially increased.

For the purpose of disclosing my invention, I have illustrated an embodiment thereof in the accompanying drawing, in which:

Fig. 1 is a sectional view of a carbonator embodying my invention.

In the structure illustrated, I provide a container tank 1 preferably having a dome-shaped top 2 and a semi-cylindrical bottom 3. This tank may be formed of any suitable material as, for instance, steel or the like, and the cylindrical walls of the tank are clamped upon a base 4, having a configuration similar to the configuration of the bottom 3. The bottom 3 is preferably formed in a single sheet and is provided with an annular flange 5 clamped between the bottom edge of the cylindrical walls of the container and an annular flange 6 on the base 4. Extending into the top of the carbonator, which incidentally is formed in substantially the same manner as the bottom, is a spiral spray head 8 projecting through an opening 9 in the top of the container. Water, to be carbonated, is admitted to the spray head through a suitable supply pipe 10. The carbon dioxide is admitted to the top of the tank by the pipe 11.

In addition to the spraying of the water in an atmosphere of carbon dioxide, the water, while in the tank, is agitated in an atmosphere of carbon dioxide and to this end, I provide an agitator in the form of a flat paddle 12 adapted to be mounted on a rotary shaft 13 extending through the tank and driven from a suitable source of power, as an electric motor or other drive member. This paddle is provided with openings 14 to assist in the agitation.

As a result of the rotation of the paddle in the body of the water, considerable agitation is imparted to the water. On the other hand, it is not desirable that the agitated water should be drawn off from the carbonator. The carbonated water is adapted to be drawn off from the bottom of the carbonator through a draw off opening 15 connected with a suitable delivery pipe 16 and it will be noted that this draw off opening is at the lowest point in the tank. To provide a "still" water storage space in the bottom of the storage tank, I arrange a baffle plate 17 concaved to substantially conform with the bottom 3 of the tank. This plate is slightly spaced from the side walls of the tank, as at 18, and is supported on suitable supporting legs 19 which extend upwardly and which have their bottom ends out-turned to be clamped between the side walls of the tank and the bottom of the tank, as indicated. In addition to the spacing between the side walls and the periphery of the baffle plate 17, I provide openings 20 in the baffle plate which have a tendency to prevent gas pockets from forming under the plate. The arrangement of this plate provides a "still" water storage space in the bottom of the tank which is not affected by the agitation resulting in the rotation of the paddle 12.

In order to obtain as high a degree of carbonation of the water and also to obtain as high a degree of carbonation of the water with as low carbonation pressure as possible, I maintain the water in a chilled state. To obtain this result, I surround the carbonated body 1 with a shell 21 which may be of sheet metal and completely enclose the body, being spaced apart therefrom, to provide a circulating chamber 22. On the face of the shell, I provide ribs 23, T-shaped in cross section and which extend completely around the shell. Similar ribs 24 are secured on the outer face of the carbonated body 1, these ribs 24 being in staggered relation to the ribs 23 and thereby providing baffle plates and an irregular path through which a refrigerant passes. This shell 21 is provided with an inlet 25 adapted to be connected with a suitable refrigerant supply compressor or other device and with an outlet 26 to provide a return connection for the refrigerant. Therefore, the refrigerant, preferably in the form of a freon gas, on being admitted to the chamber, will flow, due to the baffle plate arrangement, around and upwardly through the chamber to its outlet 26, maintaining the interior of the carbonator body at the proper degree of temperature.

In order to insure the efficiency of the refrigerating shell, an additional outer shell 27 surrounds the shell 21 for protection and the space between these two shells is filled with suitable insulating material as 28.

I claim as my invention:

1. In a carbonator, the combination with a carbonating tank, means for delivering thereto water to be carbonated, a rotary agitator operating in said tank for agitating the water therein, said tank having a drawoff opening at the bottom thereof and a baffle plate arranged in said tank below said agitator and above said drawoff opening to provide a still space in said tank above said drawoff opening.

2. In a carbonator, the combination with a carbonating tank, of means for delivering water to be carbonated thereto, a rotary agitator operating in said tank for agitating the water therein, said tank having a drawoff opening at the bottom thereof and a dividing wall in said tank between said agitator and said drawoff opening to divide the tank into two chambers and communicating passages established between said chambers.

3. In a carbonator, the combination with a carbonating tank, of means for delivering the water to be carbonated to said tank, a rotary agitator operating in said tank for agitating the water therein, said tank having a drawoff opening at the bottom thereof, a dividing wall between said agitator and said drawoff opening to divide the tank into two chambers and relatively restricted passages established between said chambers.

4. In a carbonator, the combination with a carbonating tank, of means for delivering water to be carbonated to said tank, a rotary agitator operating in said tank for agitating the water therein, said tank having a drawoff opening at the bottom thereof and a baffle plate arranged in said tank below said agitator and above said drawoff opening to provide a still space in said tank above the drawoff opening, the periphery of said baffle plate being spaced from the wall of the tank to provide a water passage.

5. In a carbonator, the combination with a carbonating tank, of means for delivering water to be carbonated thereto, a rotary agitator operating in said tank for agitating the water therein, said tank having a drawoff opening at the bottom thereof and a baffle plate arranged in said tank below said agitator and above said drawoff opening to provide a still space in said tank above said drawoff opening, said baffle plate being spaced at its periphery from the wall of the tank to provide a water passage and having openings at its center.

6. In a carbonator, the combination with a carbonating tank having a concave bottom, of means for delivering water to be carbonated thereto, a rotary agitator operating in said tank for agitating the water therein, said tank having a drawoff opening at the bottom thereof and a concave baffle plate coinciding substantially with the bottom of the tank disposed in said tank between said agitator and said drawoff opening to provide a still space in said tank above said opening.

JAMES KANTOR.